US009810536B2

(12) United States Patent
Czompo

(10) Patent No.: US 9,810,536 B2
(45) Date of Patent: Nov. 7, 2017

(54) METHOD AND APPARATUS FOR ACCURATE ACQUISITION OF INERTIAL SENSOR DATA

(71) Applicant: QUALCOMM Incorporated, San Diego, CA (US)

(72) Inventor: Joseph Czompo, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 215 days.

(21) Appl. No.: 14/963,028

(22) Filed: Dec. 8, 2015

(65) Prior Publication Data

US 2016/0091316 A1 Mar. 31, 2016

Related U.S. Application Data

(63) Continuation of application No. 12/475,262, filed on May 29, 2009.

(51) Int. Cl.
*G01C 21/16* (2006.01)
*G01C 25/00* (2006.01)

(52) U.S. Cl.
CPC .......... *G01C 21/16* (2013.01); *G01C 25/005* (2013.01)

(58) Field of Classification Search
CPC .................................................. G01C 21/16
See application file for complete search history.

(56) References Cited

U.S. PATENT DOCUMENTS 4,608,641 A * 8/1986 Snell ...................... G01C 21/16
701/4
5,991,692 A 11/1999 Spencer, II et al.
6,381,340 B1 * 4/2002 Storey .................... G01C 21/16
348/169
2007/0073482 A1 3/2007 Churchill et al.
2007/0118286 A1 5/2007 Wang et al.
2007/0178846 A1 8/2007 Cutler
2010/0260242 A1 10/2010 Abe et al.
2010/0305899 A1 12/2010 Czompo et al.

FOREIGN PATENT DOCUMENTS

| CN | 101067656 A | 11/2007 |
|---|---|---|
| CN | 201488737 U | 5/2010 |
| GB | 2443248 A | 4/2008 |
| JP | 2002519653 A | 7/2002 |
| KR | 1020010071600 | 7/2001 |
| TW | 201006529 A | 2/2010 |
| WO | 0000790 A1 | 1/2000 |
| WO | 2009110172 A1 | 9/2009 |

OTHER PUBLICATIONS

International Search Report and Written Opinion—PCT/US2010/036669, International Search Authority—European Patent Office—Aug. 11, 2010.
Taiwan Search Report—TW099117267—TIPO—May 20, 2013.
Taiwan Search Report—TW099117267—TIPO—Feb. 13, 2014.

* cited by examiner

*Primary Examiner* — Manuel Rivera Vargas
(74) *Attorney, Agent, or Firm* — Muncy, Geissler, Olds & Lowe, P.C.

(57) ABSTRACT

The subject matter disclosed herein relates to a system and method for receiving a plurality of signals generated by a plurality of sensors adapted to detect physical movement of a mobile device with respect to a plurality of coordinate axes. A time at which at least one of the received signals is digitized is delayed to provide an output of digitized versions of the received plurality of signals synchronized with respect to a common point in time.

30 Claims, 6 Drawing Sheets

METHOD AND APPARATUS FOR ACCURATE ACQUISITION OF INERTIAL SENSOR DATA

CROSS-REFERENCE TO RELATED APPLICATIONS

The present Application for Patent claims the benefit of U.S. patent application Ser. No. 12/475,262, entitled "METHOD AND APPARATUS FOR ACCURATE ACQUISITION OF INERTIAL SENSOR DATA," filed May 29, 2009, assigned to the assignee hereof, and expressly incorporated herein by reference in its entirety.

BACKGROUND

Field

The subject matter disclosed herein relates to acquisition and processing of inertial sensor data for a mobile device.

Information

Movement of a mobile device may be tracked to determine a position, orientation, and velocity of the mobile device at a particular point in time. If acceleration or movement of a mobile device about three coordinate axes can be determined and measured, such information may be utilized to estimate a current position, orientation, and velocity. Such coordinate axes may be orthogonal with respect to each other and may be utilized to represent a three-dimensional space.

In order to precisely estimate position, orientation, and velocity, it may be useful to measure linear acceleration and/or rotation rate along or about one or more coordinate axes. A precise determination may be made if sensor measurements from a plurality of sensors are processed at the same time. If analog sensors are utilized, analog output signals from such analog sensors may be converted to a digital format by, for example, an analog-to-digital conversion before additional processing. A particular analog sensor may generate a raw signal which is responsive to acceleration, and may filter such a raw signal before providing an analog signal for further processing. Different sensors may utilize filters having different associated processing delays. For example, an accelerometer may generate a raw signal and then spend 1.0 microsecond, for example, to filter such a raw signal before outputting an analog signal. A gyroscope, on the other hand, might generate a raw signal and then filter such a raw signal for a different amount of time such as, for example, 1.5 microseconds. Accordingly, in the example above, upon sensing a physical event representing itself as simultaneous acceleration and rotation of a device, such an accelerometer may output an analog signal 0.5 microseconds prior to a time at which such a gyroscope outputs an analog signal based on the same detected physical event.

BRIEF DESCRIPTION OF THE FIGURES

Non-limiting and non-exhaustive features will be described with reference to the following figures, wherein like reference numerals refer to like parts throughout the various figures.

SUMMARY

Figure 1A:
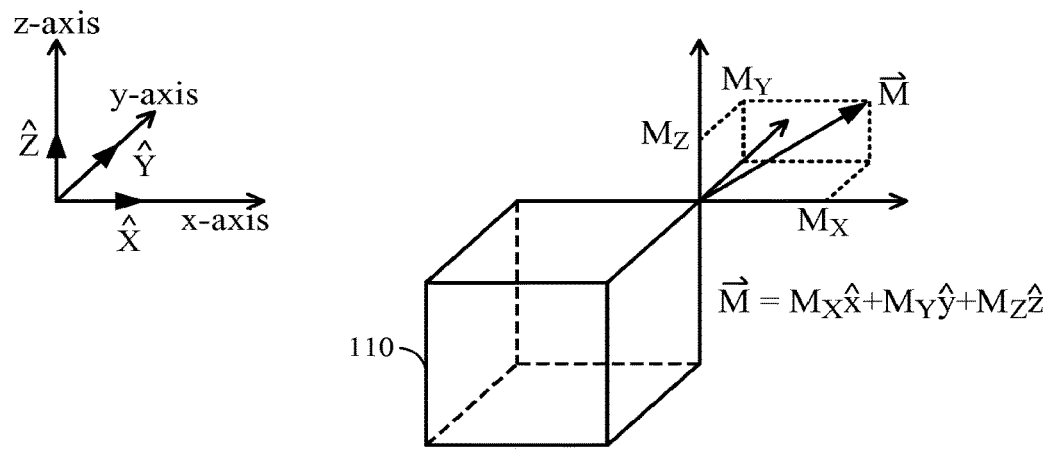
FIG. 1A shows a coordinate system (x, y, z) for representing linear movement with respect to scalar values, a series of scalar values, or time varying functions ($M_X$, $M_Y$, $M_Z$) as measured by an accelerometer according to one aspect.

In one particular implementation, a method is provided in which a plurality of signals are received from a plurality of sensors adapted to detect physical movement of a mobile device with respect to a plurality of coordinate axes. A time at which at least one of the signals is digitized is delayed to provide an output of digitized versions of the received plurality of signals synchronized with respect to a common point in time. It should be appreciated, however, that this is merely an example implementation and that other implementations may be employed without deviating from claimed subject matter.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

High performance Satellite Positioning System (SPS) based navigation systems may rely on motion sensors in order to provide an accurate position and velocity estimate for a mobile device in a scenario where there is a weak or absent SPS signal. This process is generally referred to as "dead reckoning." Various sensors may be utilized to provide data. Multiple axis acceleration and rotational information may be provided by accelerometers and gyroscopes to a computation engine which then estimates a current position and velocity for a mobile device based on initial conditions without relying solely on the SPS signal. High performance systems may also employ additional sensors to monitor the temperature of various sensors, altitude and magnetic heading in order to aid the navigation estimation. In general, analog sensor signals are filtered to remove noise, buffered, digitized and passed onto a computation engine. Significant errors may be introduced in this acquisition process if the digitized samples are time misaligned due to either various delays introduced by prior analog processing or the non-concurrent nature of a sampling mechanism itself.

A sensor acquisition system may include multiple sensors, each providing a signal responsive to a sensed event, such as movement. In one implementation, as discussed herein, a sensor acquisition system may include six independent channels, each channel corresponding to an output signal from a particular sensor. Unlike some systems where a single acquisition channel is used to time multiplex sensor signals, a system as discussed herein may provide for concurrent or simultaneous acquisition of critical sensor signals. In a time multiplexed system, for example, there may be a single communication channel from multiple analog sensors to a sampler, for example, and analog signals from such sensors may be sent to a sampler in a time multiplexed manner. In such a time multiplexed system, small errors that result from acquiring the navigation sensor signals corresponding to different time points may accumulate over time and lead to inaccuracy in a final estimated position, orientation, and velocity of a mobile device. In general, such errors may be avoided by reconstructing desired sensor signals in a digital domain via interpolators and re-sampling such that samples correspond to the same time point. However, such an approach may introduce extra complexity, power consumption, and latencies that may generally be unacceptable for inertial dead-reckoning. In a system as discussed herein, errors due to time misalignment of sensor samples may be avoided in a power efficient way. Furthermore, any systematic delay between sensor channels introduced as a result of external filtering may be effectively eliminated by properly adjusting a sampling instant of individual channels. Non-navigation sensor signals (e.g., for measuring temperature or pressure, to name just a couple among many possible measurable conditions) may still be acquired by the existing channels in a time multiplexed fashion, as such sensor data generally changes slowly and may only be used indirectly in computation of a navigation solution, such that resulting errors may be negligible for most practical applications.

An implementation, as discussed herein, may substantially reduce or eliminate errors resulting from time misalignment of sensor samples. Such an implementation may also save complexity, power, and most importantly latency as compared to other implementations which employ time interleaving and subsequent signal processing to realign samples.

According to some implementations, a mobile station may include an inertial navigation system having various sensors, such as three gyroscopes to detect angular rotation rate about three coordinate axes, and three accelerometers to detect linear acceleration in a direction along one or more of such coordinate axes. Measurements from such sensors may be utilized to determine a change in position, orientation, and velocity of a mobile station from a previous point in time to a current point in time. Such information may be utilized, for example, in a mapping application to visually show a user where such a mobile station is located on a map of known locations.

A mobile station having such an inertial navigation sensor may include additional sensors, such as a thermometer, barometer, or any other type of sensor capable of providing a measurement of a factor which may affect performance of other sensors, for example. Such additional sensors may be used for calibration of motion sensors, for example. In one implementation, measurements obtained from accelerometers, for example, may be dependent upon ambient temperature or barometric pressure at the time such measurements were obtained. For example, a measurement obtained in a warm temperature and/or high barometric pressure may include a different magnitude of acceleration than would a measurement obtained at a colder temperature and/or lower barometric pressure. Such measurements from a thermometer or barometer, for example, may therefore be utilized when determining a current position, orientation, and velocity of a mobile station based on sensor readings obtained from accelerometers and gyroscopes.

Sensors such as accelerometers and gyroscopes may generate analog signals which may subsequently be converted into a digital format for subsequent processing. Results may be obtained from digital samples from each sensor that are aligned such that a particular sample for one of the sensors matches up in time with digital samples obtained from analog signals for other sensors.

A six-channel digitizer may be utilized to simultaneously sample analog signals from six sensors. An analog signal generated by each of six sensors, such as three accelerometers and three gyroscopes, may be provided to each of six input channels to such a six-channel digitizer. It should be appreciated that in some implementations, a different number of input channels may be utilized, such as seven input channels. In a seven-channel digitizer, an analog signal representative of temperature or barometric pressure, for example, may be input in a seventh channel.

A digitizer may sample input analog signals and convert each analog input signal into a respective digital output signal. A digitizer may include six different sampling units, for example, so that six input analog signals may be sampled simultaneously. A digitizer may include six output channels, each respective output channel providing a digital output signal. Such digital output signals may be transmitted across one or more busses, for example, to a processor or other controller for subsequent processing. For example, a processor may utilize such output digital signals to determine a current position, orientation, and velocity of a mobile device.

A digitizer may also include several delay elements associated with each input signal. Such delay elements may be utilized to delay a time at which a particular analog input signal is digitized. Such delay elements may be utilized to ensure that respective digital output signals provided by respective output channels are aligned in time with respect to one another. Accordingly, a time at which a first analog input signal is digitized may be delayed to synchronize with a time at which a second analog input signal is digitized. Such digital output signals may be aligned in time in this manner to ensure that an accurate position, orientation, and velocity may be determined for a mobile device. Because linear accelerations and angular rates may rapidly change over short periods of time, it may be advantageous for such digital output signals from distinct output channels to be aligned in a time domain such that a particular sample of a digital output signal corresponds to the same point in time as a particular sample of a different digital output signal.

Such delays may be utilized because different sensors may incur different processing delays before providing analog signals to a digitizer. A reason for a difference in processing delay may be due to different filtering methods used by different sensors. For example, an accelerometer may include a filter to quickly filter a signal prior to outputting an analog signal. A gyroscope, on the other hand, may include a filter which more slowly processes a signal prior to outputting an analog signal. Moreover, it should be appreciated that different ones of the same type of sensor may have different processing delays. For example, a first gyroscope may use different filters than a second gyroscope and therefore, a processing time for a first gyroscope may differ from a processing time for a second gyroscope.

In one example, an event may occur at time t. A first sensor may sense an event at time t and output a first analog signal 3.0 μsec after the event, or at time t+3.0 μsec. A second sensor may, on the other hand, sense the same event at time t and output a second analog signal 1.2 μsec after the event, or at time at time t+1.2 μsec. To ensure that such first and second analog signals are digitized with respect to a common point in time, the first analog signal may be digitized 1.8 μsec after the second signal is digitized. Accordingly, digitized versions of both the first analog signal and the second analog signal may are aligned in time with respect to the same event that occurred at time t.

If such processing delays are known a priori, delay elements of a digitizer may be programmed to sufficiently delay digitizing input analog signals such that corresponding digital output signals are aligned in the time domain with respect to a sensed event, such as a detected acceleration. Alternatively, a digitizer may include control lines to program various delays on-the-fly based on determined processing delays.

Although much of the description above is directed to a six-channel digitizer, it should be appreciated that more, or fewer than six input channels may be utilized in some implementations. In the event that a seventh input channel is utilized to provide an analog signal representative of temperature, for example, such signal may be digitized and output via a seventh output line from the digitizer.

One implementation may utilize six different sensors which provide output analog signals to an analog-to-digital converter. Such an implementation may couple such sensors to a multiplexer which is, in turn, coupled to an analog-to-digital converter. In such a system, only one input signal may be sampled at a time and such a multiplexer may be utilized to select which input analog signal to transmit over a bus to an analog-to-digital converter. A drawback of using a single analog-to-digital converter, however, is that sampled signals are not aligned in time because the analog-to-digital sampler cannot sample more than one analog input signal at a particular point in time.

Another implementation may utilize a first integrated circuit, for example, containing three gyroscopes and a second integrated circuit containing three accelerometers. Such a first or second integrated circuit may include a single analog-to-digital converter within the chip and may provide output digital signals. A drawback of such a system, however, is that only a signal from one of the three sensors of a particular integrated circuit may be sampled at a particular time. In other words, all three sensors of a particular integrated circuit may utilize the same analog-to-digital converter such that output digital signals for the three internal sensors are therefore not aligned in time.

One other implementation may utilize an integrated circuit having both a signal sensor and a sampler such that upon sensing an event, such as an acceleration, a digital signal is provided by the integrated circuit. If there are six sensors, then six digital output signals may be generated by six separate samplers. A drawback of such an implementation, however, is that once samplings occurred there is no way to synchronize the output timing at which digital output signals are generated by each integrated circuit having a sensor. For example, if one of the sensors utilizes filters having a different processing delay than a different sensor, digital output signals may not be properly aligned in time and a calculated position, orientation, and velocity based on digital output signals may be imprecise.

Accordingly, an implementation as discussed herein may provide a six (or more) channel digitizer to receive input analog signals, and sample such signals to generate digital output signals. Digitizers may undergo selected delays to delay a time at which such signals are digitized to ensure that corresponding digital output signals represent analog events which occur at the same instant in time. Such a digitizer may provide a robust inertial navigation system to detect a position, orientation, and velocity of a mobile device with a relatively high degree of accuracy at a particular point in time.

As discussed herein, an accelerometer may be used to sense the direction of gravity and any other linear force experienced by the accelerometer. A gyroscope may be utilized to measure heading changes and rotation. A barometer or a barometric pressure sensor may be utilized to measure atmospheric pressure. An altimeter may be utilized to measure a change in elevation. It should be understood, however, that these are merely examples of sensors that may be used in particular implementations, and claimed subject matter is not limited in this respect.

Particular implementations may employ accelerometers and gyroscopes ("gyros") to provide 6-axes of observability (x, y, z, τ, φ, ψ). An accelerometer may sense linear motion (i.e., velocity change in a plane, such as a horizontal plane). Velocity change can be measured with reference to at least two axes. Such an accelerometer can also offer a measure of an object's tilt (roll or pitch) in the presence of gravity. Thus, with a single 3D accelerometer, an object's motion in Cartesian coordinate space (x, y, z) can be sensed, and the direction of gravity can be sensed to estimate the object's roll (τ) and pitch (φ). Since accelerometers may not be able to easily differentiate between the object's linear motion and tilt, a gyroscope may be used to measure the rotation about (x, y, z) coordinates, that is, roll (τ) and pitch (φ) and yaw (ψ), sometime referred to as azimuth or heading.

Linear accelerometers, gyroscopes, and/or one or more barometers may be integrated into a portable electronic device to provide adequate degrees of observability. FIG. 1A shows a coordinate system (x, y, z) for representing linear movement with respect to scalar values, a series of scalar values, or time varying functions ($M_X$, $M_Y$, $M_Z$) as measured by an accelerometer 110. Some accelerometers 110 may provide a magnitude while others may simply provide an indication of movement without a magnitude. An accelerometer 110 may measure linear movement (vector M) along a line with reference to one, two or three linear directions, often referenced with Cartesian coordinates (x, y, z). For example, a one-dimensional accelerometer 110 may provide measurements to indicate linear movement along an x-axis. A two-dimensional accelerometer 110 may provide measurements to indicate linear movement in a plane along both x-axis and y-axis, and a three-dimensional accelerometer 110 may provide measurements to indicate linear movement in 3-dimensional space along x, y and z-axes. A three-dimensional accelerometer 110 may comprise a two-dimensional accelerometer combined with a one-dimensional accelerometer, or may comprise three one-dimensional accelerometers. An accelerometer 110 may provide measurements in terms of linear acceleration (in units representing distance per units of time squared; e.g., [m/sec$^2$]) or linear velocity change (in units representing distance per units of time; e.g., [m/sec]). Linear motion (vector M) may be represented by three values in vector form $M=M_X X+M_Y Y+M_Z Z$, where ($M_X$, $M_Y$, $M_Z$) are magnitudes, scalar values, a series of scalar values, or time varying functions, and (X, Y, Z) are unit vectors with respect to the origin of a Cartesian coordinate system (x, y, z). In general, an accelerometer as described herein may comprise a sensing means for detecting motion and generating information indicative of linear movement along the one, two or three axes of such an accelerometer. Alternatively, a non-Cartesian coordinate system can be used such as a coordinate system aligned with the body frame of the device. In particular implementations, a coordinate system may define axes that are mutually orthogonal.

Figure 1B:
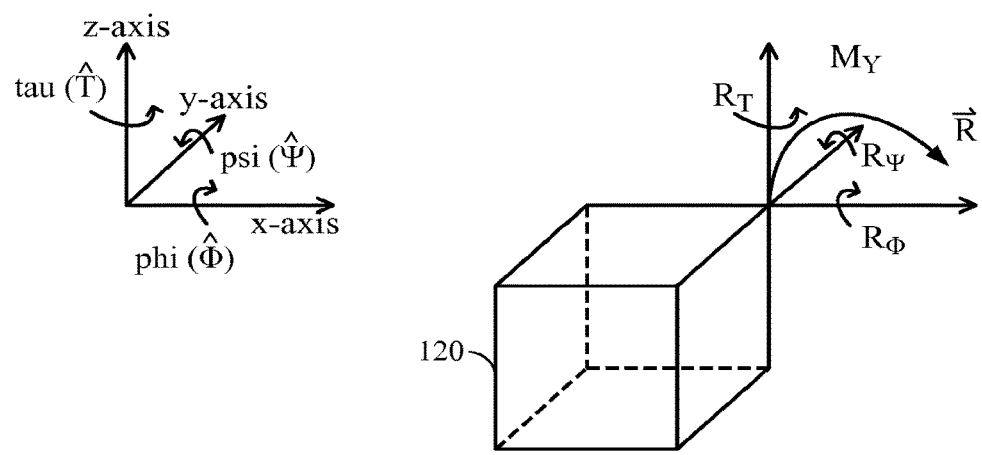
FIG. 1B shows a coordinate system ($\tau$, $\phi$, $\psi$) for representing rotational movement with respect to scalar values, a series of scalar values, or time varying functions ($R_\tau$, $R_\phi$, $R_\psi$) as measured by a gyroscope according to one aspect.

FIG. 1B shows a coordinate system ($\tau$, $\phi$, $\psi$) for representing rotational movement with respect to scalar values, a series of scalar values, or time varying functions ($R_\tau$, $R_\phi$, $R_\psi$) as measured by a gyroscope 120. Here, gyroscope 120 may measure rotational movement (vector R) about one, two or three axes. In one particular implementation, gyroscopic rotation may be measured in terms of coordinates ($\tau$, $\phi$, $\psi$), where tau ($\tau$) represents yaw or rotation about the z-axis, phi ($\phi$) represents roll or rotation about the x-axis, and psi ($\psi$) represents pitch or rotation about the y-axis. In another implementation, gyroscope 120 may comprise a one-dimensional gyroscope to provide measurements indicating rotational movement about a first axis. In another implementation, a gyroscope 120 may comprise a two-dimensional gyroscope to provide measurements indicating rotational movement about a first axis and a second axis. Likewise, in another implementation, gyroscope 120 may comprise a three-dimensional gyroscope to provide measurements indicating rotational movement about first, second and third axes. Such a three-dimensional gyroscope may comprise a two-dimensional gyroscope combined with a one-dimensional gyroscope, or may comprise three one-dimensional gyroscopes. Gyroscope 120 may provide measurements in terms of angular angular velocity (in units representing change in an angle per unit of time; e.g., [rad/sec], or an angular change (in units representing an angle; e.g., [rad]). Rotational motion (vector R) may be represented by three scalar values, a series of scalar values, or time varying functions in vector from, where $R = R_\tau \tau + R_\phi \phi + R_\psi \psi$, where ($R_\tau$, $R_\phi$, $R_\psi$) are scalar values, a series of scalar values or time varying functions, and where ($\tau$, $\phi$, $\psi$) are unit vectors in with respect to the rotational coordinate system ($\tau$, $\phi$, $\psi$). In particular implementations, a gyroscope, as described herein, may comprise a sensing means for detecting motion and producing information indicative of angular movement about one, two or three axes of the gyroscope.

In one example, a three-dimensional accelerometer 110 and a three-dimensional gyroscope (e.g., gyroscope 120) provide six axes of observability (x, y, x, $\tau$, $\phi$, $\psi$). Two three-dimensional accelerometers 110 may also provide six axes of observability ($x_1$, $y_1$, $x_1$, $x_2$, $y_2$, $x_2$). A reduced dimensional sensor may be used to sense fewer axes of linear and/or rotational motion. For example, a two-dimensional accelerometer 110 and a two-dimensional gyroscope 120 may provide four axes of observability (x, y, $\tau$, $\phi$). Techniques described herein may implement a single-sensor or a multi-sensor mobile device measuring one or more dimensions.

Figure 2:
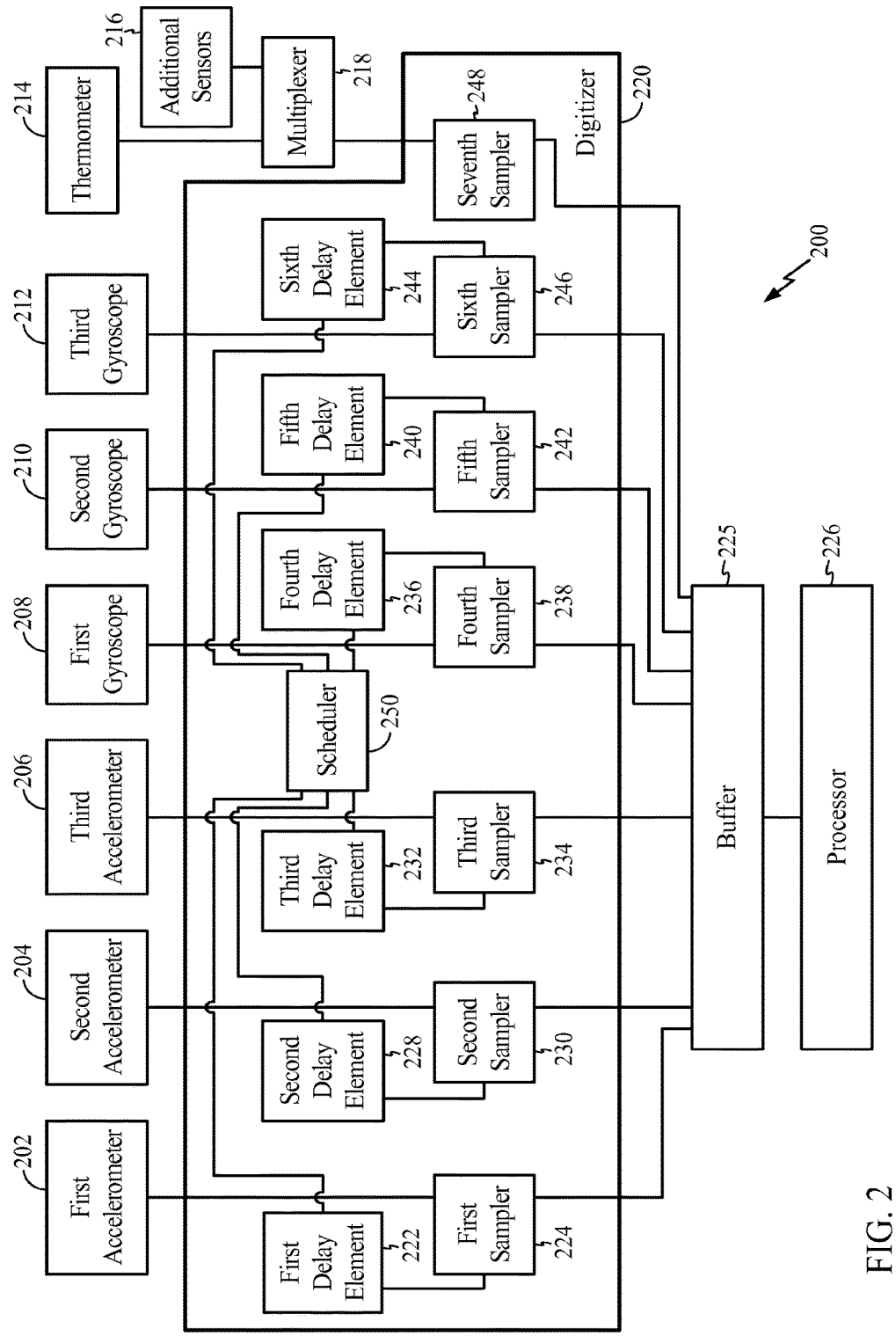
FIG. 2 is a schematic diagram of an inertial navigation system according to one implementation.

FIG. 2 is a schematic diagram of an inertial navigation system 200 according to one implementation. Such an inertial navigation system 200 may be contained within a mobile device, such as a cellular telephone, Personal Digital Assistant (PDA), or any other portable device. Such an inertial navigation system 200 may be adapted to determine a position, orientation, and velocity of a mobile device at a particular point in time. Inertial navigation system 200 may include a number of sensors, such as a first accelerometer 202, a second accelerometer 204, a third accelerometer 206, a first gyroscope 208, a second gyroscope 210, and a third gyroscope 212, each of which may provide an analog signal representative of a sensed event, such as a linear acceleration or angular rate, to a digitizer 220. Each of first accelerometer 202, second accelerometer 204, and third accelerometer 206 may be adapted to sense a linear acceleration along a predefined linear axis. Each of first gyroscope 208, second gyroscope 210, and third gyroscope 212 may be adapted to sense an angular rate about a predefined linear axis.

Other sensors, such as a thermometer 214, a barometer, or any other additional sensors 216 capable of measuring conditions may also be included. Thermometer 214 and additional sensors 216 may each generate respective analog signals and be in communication with a multiplexor 218, which is adapted to selectively transmit one of the input analog signals to digitizer 220 at a particular time.

First accelerometer 202 may provide an analog signal representative of a sensed acceleration along a first predefined axis to a first delay element 222 of digitizer 220. First delay element 222 may delay a time at which an analog signal from first accelerometer is provided to a first sampler 224. First delay element is utilized to ensure that a time at which first sampler 224 receives a first analog signal is aligned in time with respect to a time at which other analog input signals are provided to respective samplers.

Delays may be utilized within digitizer 220 to account for differing processing delays among various sensors providing analog signals to digitizer 220. For example, first accelerometer 202 may include various filters which may introduce a processing delay by a time at which an analog signal is provided. First gyroscope 208, on the other hand may include its own filters which may also introduce a processing delay which may be different from a processing delay of first accelerometer 202. Delaying a time at which an analog input signal is sampled may be utilized to allow an analog signal supplied by a sensor having a longer processing delay to "catch up" in time to other analog input signals. Use of such delays may ensure that digital output signals based on analog input signals are aligned in time.

In one example, an event may occur at time t. A first sensor may sense an event and output a first analog signal 3.0 μsec after the event, or at time t+3.0 μsec. A second sensor may, on the other hand, sense an event and output a second analog signal 1.2 μsec after the event, or at time at time t+1.2 μsec. A third sensor may sense an event and output a third analog signal 1.7 μsec after the event, or at time at time t+1.7 μsec. To ensure that such first, second, and third analog signals are digitized with respect to a common point in time, the first analog signal may be digitized 1.8 μsec after the second analog signal is digitized. The third analog signal may be digitized 0.5 μsec after such digitization of the second analog signal occurs.

Referring back to FIG. 2, digitizer 220 may include samplers and delays elements to process some, or all analog input signals. Second delay element 228 and second digitizer 230 may be utilized to digitize an analog signal from second accelerometer 204 and output a second digital output signal aligned in time with a first digital output signal output by first sampler 224. Similarly, third delay element 232 and third sampler 234 may be utilized to digitize an analog signal from third accelerometer 206 and output a third digital output signal. Fourth delay element 236 and fourth sampler 238 may be utilized to digitize an analog signal from first gyroscope 208 and output a fourth digital output signal. Fifth delay element 240 and fifth sampler 242 may be utilized to digitize an analog signal from second gyroscope 210 and output a fifth digital output signal. Sixth delay element 244 and sixth sampler 246 may be utilized to digitize an analog signal from third gyroscope 212 and output a sixth digital output signal. Digitizer may include a scheduler 250 or a controller to set various delay amounts for such delay elements.

Multiplexer 218 may provide an analog signal from either thermometer 214 or additional sensors 216 to a seventh sampler, which may convert such analog signal into a seventh digital output signal. Certain conditions, such as temperature or barometric pressure, may change relatively slowly. Accordingly, a delay element may not be needed to delay a time at which such an analog input signal is sampled to produce a seventh digital output signal.

Upon receiving first-seventh digital output signals, processor 226 or some other processor, controller, or computation engine may determine a current position, orientation, and velocity of a mobile device. In one particular implementation, processor 226 may comprise a digital signal processor (DSP). Such a seventh digital output signal representative of temperature or atmospheric pressure, for example, may be utilized to adjust certain mathematical weightings utilized in determining such position, orientation, and velocity information. For example, temperature or barometric pressure may affect operating performance of sensors such as accelerometers or gyroscopes.

Buffer 225 may be utilized to store digital output signals corresponding to each input analog signal. Buffer 225 may be utilized to provide such digital output signals to processor 226 in a time-multiplexed manner, for example. In one implementation, there may be multiple input channels to buffer 225, and one or more output channels to processor 226. In the example shown in FIG. 2, there is one output channel to processor 226. Although a buffer 225 is shown in FIG. 2, it should be appreciated that other circuitry, such as a parallel latch, for example, may be utilized to store digital output signals corresponding to each input analog signal.

Figure 3:
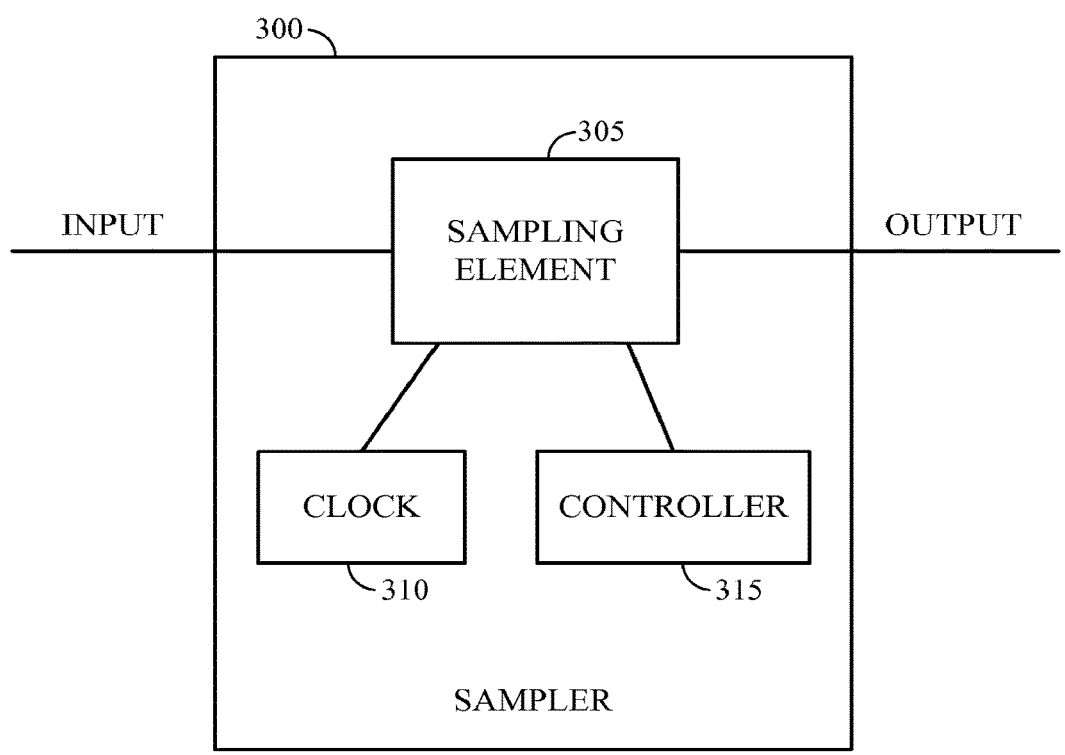
FIG. 3 illustrates a sampler according to one particular implementation.

FIG. 3 illustrates a sampler 300 according to one particular implementation. As shown, sampler 300 may include various elements, such as a sampling element 305, clock 310, and controller 315. It should be appreciated that there may also be additional or different elements included within sampler 300. Controller 315 may control sampling element 305 to sample an input analog signal and generate an output digital signal. Clock 310 may be utilized to indicate when a sample is to be taken of an input analog signal, for example.

Figure 4:
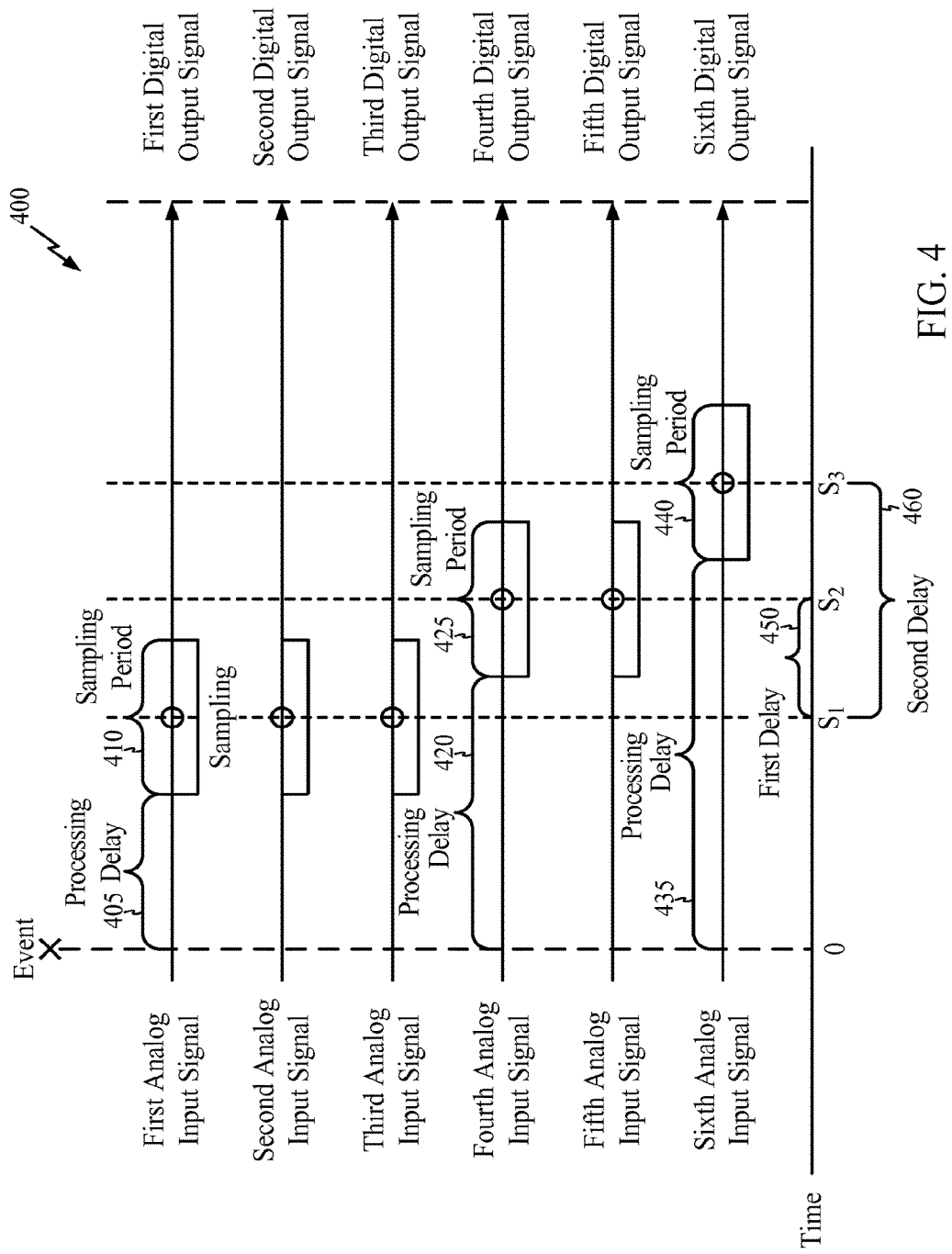
FIG. 4 illustrates a timeline illustrating various processing delays, sampling periods, and post-sampling delays according to one implementation.

FIG. 4 illustrates a timeline 400 illustrating various processing delays and sampling periods according to one implementation. FIG. 4 illustrates six input signals, e.g., first-sixth analog input signals. At time "0," an event, such as a detection of an acceleration or other movement occurs. Upon detection, a sensor may generate a raw signal, which may be filtered and then output. Such filtering, for example, may introduce a processing delay, as discussed above. A first analog input signal may experience a processing delay 405 before being output to a sampler. If first analog signal were sampled without any additional delays, a sampler would sample first analog input signal during a sampling period 410, which may occur centered around time $S_1$ to generate a first digital output signal. A similar process may be performed on second and third analog input signals to ensure that second and third digital output signals correspond to digitized versions of second and third analog signals at time "0."

Fourth and fifth analog input signals may be provided after a processing delay 420, which is longer than processing delay 405. Without adding any additional delays, such input analog signals would be sampled during a sampling period 425 centered around time $S_2$ to generate fourth and fifth digital output signals. A sixth analog input signal may be provided after a long processing delay 435, which may be longer than processing delays 405 or 420. Without adding any additional delays, a sampler may sample sixth analog input signal during a sampling period 440 centered around time $S_3$ to generate a sixth output signal.

FIG. 4 illustrates digital output signals that are not aligned in time, due to differences in processing delays between when an event is sensed and when analog input signals are provided to a digitizer. As shown, the midpoint of the sampling period for the first three analog input signals is at time $S_1$, the midpoint of the sampling period for the fourth and fifth analog input signals is at time $S_2$, and the midpoint of the sampling period for the sixth analog input signal is at time $S_3$. To ensure that the analog input signals are sampled with respect to a common point in time, the sampling of the last three analog input signals may be delayed so that digitized versions of all six analog input signals are aligned in time with respect to an event sensed at the same time, e.g., time "0." Accordingly, the first three analog input signals may be digitized at time t, for example. Fourth and fifth analog signals may be digitized after a first delay 450 during time period ($S_2$–$S_1$). Sixth analog signal may be digitized after a second delay 460 during time period ($S_3$–$S_1$). Such delays may therefore be utilized to ensure that digitized versions of all six analog input signals are aligned in time with respect to the same sensed event.

Figure 5:
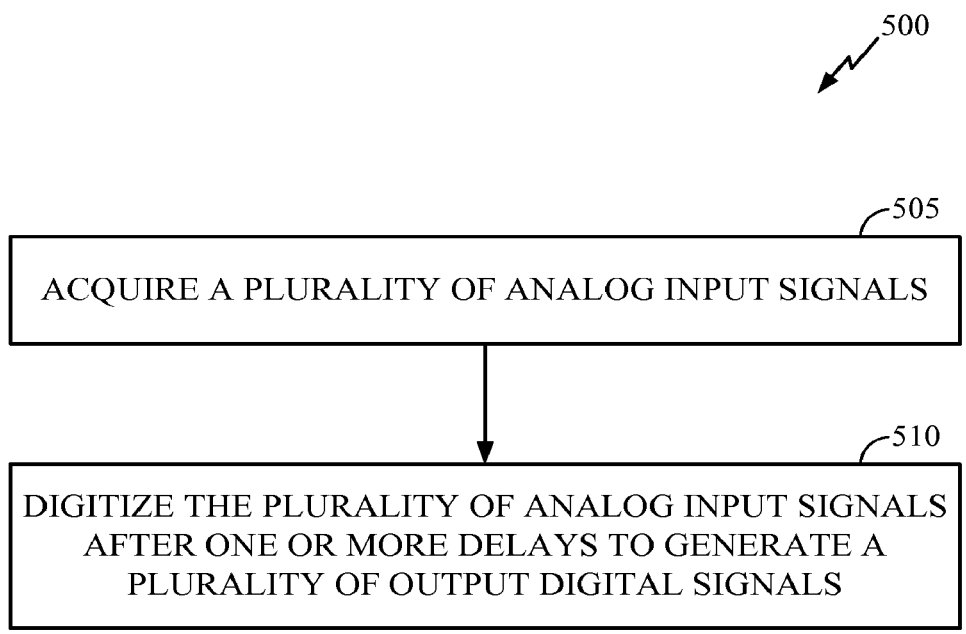
FIG. 5 illustrates a method for generating digital output signals aligned in time according to one implementation.

FIG. 5 illustrates a method 500 for generating digital output signals aligned in time according to one implementation. First, at operation 505, a plurality of analog signals may be acquired from a plurality of sensors adapted to detect physical movement of a mobile device with respect to a plurality of coordinate axes. Such physical movement may comprise acceleration along one or more coordinate axes or angular acceleration about one or more of such coordinate axes, for example.

Next, at operation 510, the plurality of analog signals may be digitized after one or more delays associated with one or more of the plurality of signals to generate a plurality of output digital signals synchronized with respect to a common point in time relative to detection of the physical movement. Such digital output signals may subsequently be processed to determine a position, orientation, and velocity of a mobile device.

Figure 6:
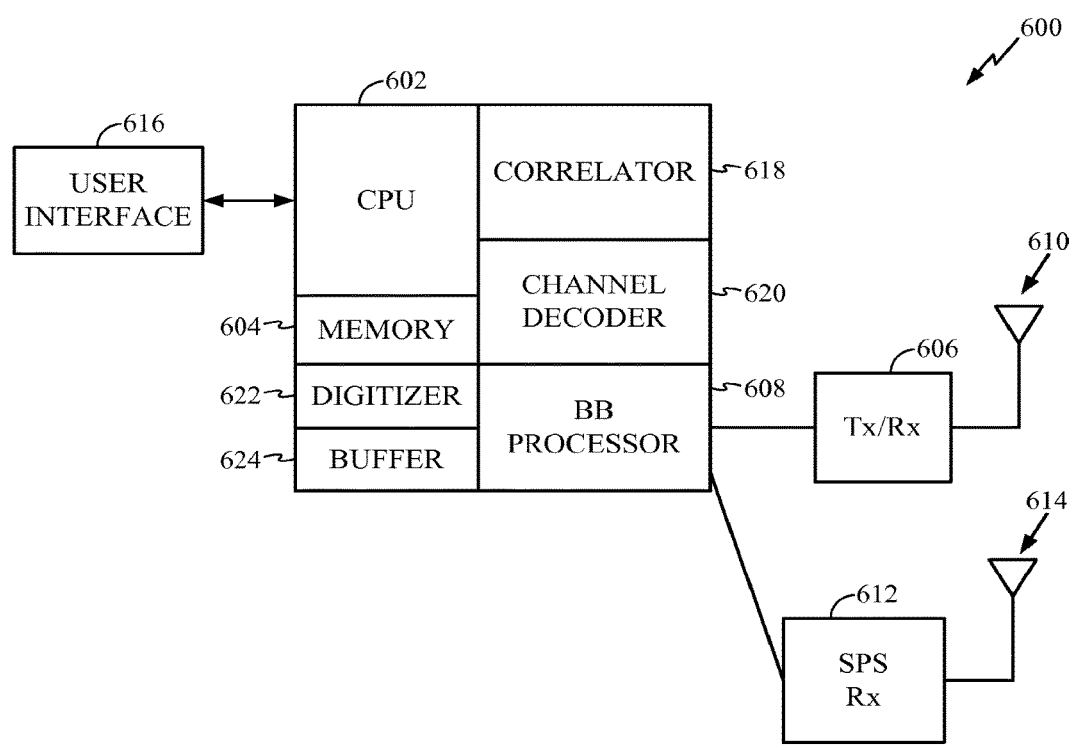
FIG. 6 is a schematic diagram of a mobile station according to one aspect.

FIG. 6 shows a particular implementation of an MS 600 in which radio transceiver 606 may be adapted to modulate an RF carrier signal with baseband information, such as voice or data, onto an RF carrier, and demodulate a modulated RF carrier to obtain such baseband information. An antenna 610 may be adapted to transmit a modulated RF carrier over a wireless communications link and receive a modulated RF carrier over a wireless communications link.

Baseband processor 608 may be adapted to provide baseband information from CPU 602 to transceiver 606 for transmission over a wireless communications link. Here, CPU 602 may obtain such baseband information from an input device within user interface 616. Baseband processor 608 may also be adapted to provide baseband information from transceiver 606 to CPU 602 for transmission through an output device within user interface 616.

MS 600 may include a digitizer 622 to covert analog signals input from various sensors into digital output signals. A buffer 624 may store such digital output signals and selectively provide such digital output signals to CPU 602 for subsequent processing.

User interface 616 may comprise a plurality of devices for inputting or outputting user information such as voice or data. Such devices may include, for example, a keyboard, a display screen, a microphone, and a speaker.

SPS receiver (SPS Rx) 612 may be adapted to receive and demodulate transmissions from SUVs through SPS antenna 614, and provide demodulated information to correlator 618. Correlator 618 may be adapted to derive correlation functions from the information provided by receiver 612. For a given PN code, for example, correlator 618 may produce a correlation function defined over a range of code phases to set out a code phase search window, and over a range of Doppler frequency hypotheses as illustrated above. As such, an individual correlation may be performed in accordance with defined coherent and non-coherent integration parameters.

Correlator 618 may also be adapted to derived pilot-related correlation functions from information relating to pilot signals provided by transceiver 606. This information may be used by a subscriber station to acquire wireless communications services.

Channel decoder 620 may be adapted to decode channel symbols received from baseband processor 608 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 620 may comprise a turbo decoder.

Memory 604 may be adapted to store machine-readable instructions, which are executable to perform one or more of processes, examples, implementations, or examples thereof which have been described or suggested. CPU 602 may be adapted to access and execute such machine-readable instructions. Through execution of these machine-readable instructions, CPU 602 may direct correlator 618 to analyze the SPS correlation functions provided by correlator 618, derive measurements from the peaks thereof, and determine whether an estimate of a location is sufficiently accurate. However, these are merely examples of tasks that may be performed by a CPU in a particular aspect and claimed subject matter in not limited in these respects.

In a particular example, CPU 602 at a subscriber station may estimate a location the subscriber station based, at least in part, on signals received from SVs as illustrated above. CPU 602 may also be adapted to determine a code search range for acquiring a second received signal based, at least in part, on a code phase detected in a first received signal as illustrated above according to particular examples.

A method, system, and apparatus, as discussed herein may be utilized to process signals generated by sensors adapted to detect movements such as linear accelerations or angular rates of a mobile device along or about one or more coordinate axes. Such signals may be digitized and delays may be introduced to ensure that digital output signals are aligned with respect to time as they are output for subsequent processing. Such time-aligned digital output signals may be utilized, for example, to determine a current position, orientation, and velocity of a mobile device.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method for acquiring inertial sensor data for a mobile device, the method comprising:
   receiving a plurality of signals generated by a plurality of sensors adapted to detect physical movement of a mobile device with respect to a plurality of coordinate axes; and
   delaying a time at which at least one of the received signals is digitized based on predefined processing delays associated with one or more of the plurality of sensors to provide an output of digitized versions of the received plurality of signals synchronized with respect to a common point in time.

2. The method of claim 1, further comprising digitizing the plurality of signals.

3. The method of claim 1, wherein the common point in time corresponds to a detection of the physical movement of the mobile device.

4. The method of claim 1, wherein the plurality of coordinate axes comprises three coordinate axes.

5. The method of claim 1, wherein the plurality of signals correspond to at least one of linear acceleration along at least one of the plurality of coordinate axes, or rotational rate along at least one of the plurality of coordinate axes.

6. The method of claim 1, further comprising acquiring one or more signals representative of a measured temperature.

7. The method of claim 1, further comprising determining at least one of a position, an orientation, or a velocity of the mobile device based on the digitized versions of the received plurality of signals.

8. The method of claim 7, further comprising modifying the determining the at least one of a position, an orientation, or a velocity of the mobile device based, at least in part, on a measured temperature.

9. The method of claim 1, wherein the plurality of signals comprises analog signals.

10. The method of claim 1, further comprising storing the digitized versions of the received plurality of signals in a memory buffer.

11. The method of claim 1, wherein the mobile device comprises a handheld device.

12. The method of claim 1, wherein the delaying comprises preventing the at least one of the received signals from being digitized until a second one of the plurality of received signals is digitized.

13. The method of claim 1, wherein the delaying comprises delaying a time at which the at least one of the received signals is sampled.

14. The method of claim 1, wherein the delaying is utilized to facilitate the synchronization.

15. A system for acquiring inertial sensor data for a mobile device, the system comprising:
a plurality of sensors configured to detect physical movement of the mobile device with respect to a plurality of coordinate axes and to generate a plurality of signals corresponding to the physical movement; and
one or more delay elements configured to delay a time at which at least one of the received signals is digitized based on predefined processing delays associated with one or more of the plurality of sensors to provide an output of digitized versions of the received plurality of signals synchronized with respect to a common point in time.

16. The system of claim 15, further comprising a digitizer configured to digitize the plurality of signals.

17. The system of claim 15, wherein the common point in time corresponds to a detection of the physical movement of the mobile device.

18. The system of claim 15, wherein the plurality of coordinate axes comprises three coordinate axes.

19. The system of claim 15, wherein the plurality of signals correspond to at least one of linear acceleration along at least one of the plurality of coordinate axes, or rotational rate along at least one of the plurality of coordinate axes.

20. The system of claim 15, further comprising a temperature sensor configured to detect a temperature.

21. The system of claim 15, further comprising a special purpose apparatus to determine at least one of a position, an orientation, or a velocity of the mobile device based on the digitized versions of the received plurality of signals.

22. The system of claim 21, further comprising a special purpose apparatus configured to modify the determination of the at least one of a position, an orientation, or a velocity of the mobile device based, at least in part, on a measured temperature.

23. The system of claim 15, wherein the plurality of signals comprises analog signals.

24. The system of claim 15, further comprising a memory buffer configured to store the digitized versions of the received plurality of signals.

25. The system of claim 15, wherein the mobile device comprises a handheld device.

26. The system of claim 15, wherein the one or more delay elements being configured to delay comprises the one or more delay elements being configured to prevent the at least one of the received signals from being digitized until a second one of the plurality of received signals is digitized.

27. The system of claim 15, wherein the one or more delay elements being configured to delay comprises the one or more delay elements being configured to delay a time at which the at least one of the received signals is sampled.

28. The system of claim 15, wherein the one or more delay elements being configured to delay the time at which at least one of the received signals is digitized is utilized to facilitate the synchronization.

29. An apparatus for acquiring inertial sensor data for a mobile device, the apparatus comprising:
means for receiving a plurality of signals generated by a plurality of sensors configured to detect physical movement of the mobile device with respect to a plurality of coordinate axes; and
means for delaying a time at which at least one of the received signals is digitized based on predefined processing delays associated with one or more of the plurality of sensors to provide an output of digitized versions of the received plurality of signals synchronized with respect to a common point in time.

30. A non-transitory computer-readable storage medium comprising computer-readable instructions for acquiring inertial sensor data for a mobile device stored thereon which, when executed by a special purpose apparatus, are configured to direct the special purpose apparatus to:
receive a plurality of signals generated by a plurality of sensors configured to detect physical movement of the mobile device with respect to a plurality of coordinate axes; and
delay a time at which at least one of the received signals is digitized based on predefined processing delays associated with one or more of the plurality of sensors to provide an output of digitized versions of the received plurality of signals synchronized with respect to a common point in time.

* * * * *